United States Patent [19]
Slough et al.

[11] 3,988,663
[45] Oct. 26, 1976

[54] LOCATOR FOR METALLIC PIPE WITH AC SIGNALS IMPRESSED

[75] Inventors: Carlton M. Slough; Edward B. Selden, III, both of Richmond, Va.

[73] Assignee: Texaco Inc., New York, N.Y.

[22] Filed: Mar. 19, 1975

[21] Appl. No.: 559,841

[52] U.S. Cl. .................................... 324/3; 324/67
[51] Int. Cl.[2] ........................................... G01V 3/08
[58] Field of Search ............... 324/3, 52, 67, 8; 340/258 C, 258 D

[56] References Cited
UNITED STATES PATENTS

| | | | |
|---|---|---|---|
| 2,109,189 | 2/1938 | Bly | 324/52 X |
| 2,558,972 | 7/1951 | McLaughlin et al. | 324/8 |
| 2,651,021 | 9/1953 | Hays | 324/52 |
| 2,698,921 | 1/1955 | Wharton | 324/67 X |
| 2,744,232 | 5/1956 | Shawhan et al. | 324/3 |
| 2,908,863 | 10/1959 | Neff | 324/67 |
| 2,993,167 | 7/1961 | Smith | 324/52 |
| 3,066,256 | 11/1962 | Rasor | 324/67 X |
| 3,418,572 | 12/1968 | Humphreys | 324/67 |
| 3,866,111 | 2/1975 | Warren | 324/3 |
| 3,893,025 | 7/1975 | Humphreys | 324/67 |
| 3,894,283 | 7/1975 | Schonstedt | 324/3 |

FOREIGN PATENTS OR APPLICATIONS

| | | | |
|---|---|---|---|
| 219,493 | 4/1957 | Australia | 324/67 |
| 818,740 | 8/1959 | United Kingdom | 324/67 |

OTHER PUBLICATIONS

Young, C. A., Measuring the Depth of Buried Cable, Bell Laboratories Record, Nov. 1965, pp. 399–401.

*Primary Examiner*—Gerard R. Strecker
*Attorney, Agent, or Firm*—T. H. Whaley; C. G. Ries; Henry C. Dearborn

[57] ABSTRACT

A locator for buried metallic pipes which carry AC signals impressed as a result of various industrial activities. It employs a pick-up coil with a ferromagnetic core. The coil is connected to a tuned bandpass amplifier that has its output connected to a head set and a meter for detecting the amplitude of the signals developed.

5 Claims, 4 Drawing Figures

LOCATOR FOR METALLIC PIPE WITH AC SIGNALS IMPRESSED

BACKGROUND OF THE INVENTION

1. Field of the Invention

This invention concerns metallic pipe locators in general. More specifically, it concerns a particularly effective metallic pipe locator that is applicable to finding buried pipes such as pipelines or the like.

2. Description of the Prior Art

There have been numerous prior proposals for different types of instruments that are applicable to determining the location of buried metallic pipe. One type uses a magnetometer to sense anomalies in the earth's magnetic field which are caused by buried metallic objects. However, there are practical difficulties, and in any event such type of instrument is not relevant to the type of locator according to this invention.

Known prior locators of the type to which this invention is applicable, have required as part of the locator, the application of a transmitter signal to the metallic pipe. This meant that the pipeline to be located had to be accessible at a nearby point for attaching the transmitter, or the transmitter had to be brought into close proximity to the line in order to couple an electromagnetic signal to the line. The latter often required two operators one for the transmitter and one for the receiver.

Furthermore, known prior systems have usually involved radio frequency transmitter signals, which added to the complexity of the receiving instrument at least.

Consequently, it is an object of this invention to provide a very simple and yet highly effective instrument for locating buried pipes or pipelines.

SUMMARY OF THE INVENTION

Briefly, the invention concerns a buried metallic pipe locator for use where said pipe has AC signals impressed thereon from AC operated cathodic protection currents or ground currents from AC operated equipment or induced currents from power lines or the like. It comprises solely a short pick-up coil with a ferromagnetic core associated therewith, and a tuned bandpass amplifier connected to said coil for amplifying said AC signals as induced in said coil. It also comprises means for detecting said amplified signals and determining the amplitude thereof.

Again briefly, the invention concerns a buried metallic pipe locator where said pipe has AC signals comprising 60, 120, 180 or 240 Hertz impressed thereon from AC operated cathodic protection currents or ground currents from AC operated equipment or induced currents from power lines or the like. It comprises a short ferrite rod having about 5,000 turns of small diameter insulated conductive wire wound thereon forming a pick-up coil for inductive coupling with said AC signals as radiated by said pipe. It also comprises a stainless steel tube with said coil and rod sealed coaxially therein, and a housing for said locator having said tube mounted thereon. In addition, it comprises a hinged rod mounted on said housing and adapted for supporting said coil axis at 45° relative to ground level when in one position, and a tuned bandpass amplifier having its input connected to said pick-up coil and comprising three stages of solid state amplification. The said first two stages of amplification are connected as Wien-bridge bandpass amplifiers and said third stage being connected as a straightforward amplifier. It also comprises means for detecting said amplifier signals that in turn comprises a head set and a micro-ammeter with rectifiers both connected to the output of said third stage for determining both aurally and visually the amplitude of said amplified signals, and means for disconnecting said pick-up coil and connecting another external coil rod and tube with a substantial length of coaxial cable for locating said pipe if beneath a body of water.

Once more briefly, the invention relates to apparatus for use in combination with a buried metallic pipe to be located, said pipe having AC signals impressed thereon from AC operated cathodic protection currents or ground currents from AC operated equipment or induced currents from power lines or the like. The said apparatus comprises a pipe locator which is solely a short pick-up coil having a ferromagnetic core associated therewith, and a tuned bandpass amplifier having the input thereof connected to said coil, and means for detecting the output of said amplifier in order to permit a directional determination from said locator to said pipe by nulling effects of said AC signals in said coil.

BRIEF DESCRIPTION OF THE DRAWINGS

The foregoing and other objects and benefits of the invention will be more fully set forth below in connection with the best mode contemplated by the inventors for carrying out the invention, and in connection with which there are illustrations provided in the drawings, wherein:

FIG. 3 is a schematic cross-sectional showing through a buried pipe and illustrating the technique that may be employed in locating such a buried pipe. It includes a related graph that indicates the amplitude of signals developed; and FIG. 4 is another schematic cross-sectional view which illustrates the technique of using a locator rod according to this invention, for determining the depth of a pipe being located.

DESCRIPTION OF THE PREFERRED EMBODIMENT

Figure 1:
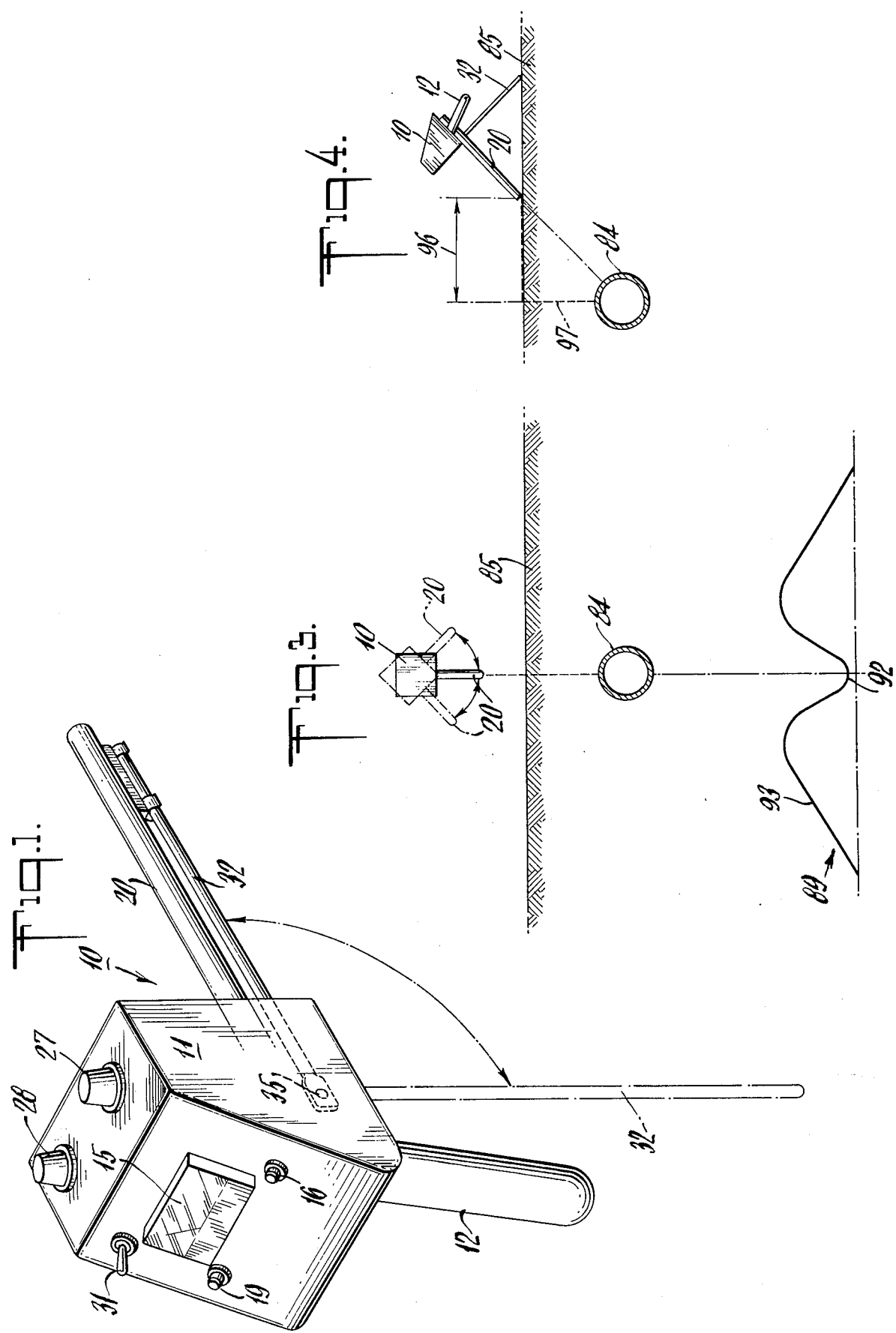
FIG. 1 is a perspective view showing an instrument for locating buried pipe, in accordance with the invention.

In connection with the general field of locating buried pipelines or pipe, there appear to have been two basic methods employed. One of these methods related to use of a magnetometer for sensing anomalies in the earth's magnetic field which are cause by buried metallic objects. The other method, to which the invention applies, has been that of using a signal transmitter to place a suitable signal on the metallic pipe or pipeline and then making use of a receiver to detect the signal radiated from such pipe or pipelines.

As indicated, this invention relates to the latter basic method. It provides a greatly simplified and consequently superior method that makes use of a simple locator which senses signals being radiated from the pipe or pipeline that is to be located, due solely to normal industrial conditions.

Heretofore, the second type of location method indicated above, has required the use of both a transmitter and a receiver instrument so as to first create the signal on the pipe or pipeline that is to be detected by the receiver. Such arrangement required that the line or pipe to be located either must be accessible at a near by point for attaching the transmitter, or the transmitter must be brought into close proximity to the pipe in order to couple an electromagnetic signal onto the line. With such procedure, if the location of the pipe or pipeline was not even generally known, much time and effort was required to make a preliminary finding by somehow having the transmitter brought into close enough proximity to the line to make the required electromagnetic coupling. Often times, such operations required two men in making the survey since one was needed on the transmitter and one for the receiver. In addition, may such prior arrangements made use of radio frequency transmitter signals, and therefor in receiving the radiated signals from the pipe line there was the complicating factor of a need to demodulate or otherwise provide for the ability to detect the received signals.

An important aspect of this invention is the discovery that a large number of buried metallic pipes or pipelines are constantly acting as radiators of AC signals which results from AC operated cathodic protection currents, or ground currents resulting from AC operated equipment on the line, or induced currents from nearby power lines. Such discovery lead to an instrument in accordance with this invention, for locating such pipes or pipelines. Such instrument is extremely compact and simple in construction while being very efficient and accurate in its results. It has been found that pipes or pipelines which are thus impressed with AC signals that are in the audio frequency range, are quite readily detectable and may be accurately located using a locator according to this invention.

While our invention may be designed to cover a rather wide audio frequency range, e.g. from 25 to 10,000 Hertz, preferably it is set for about 180 Hertz as being the best for amplification of the indicated radiation signals. Such signals have been found to be normally 60, 120, 180 and 240 Hertz.

Figure 2:
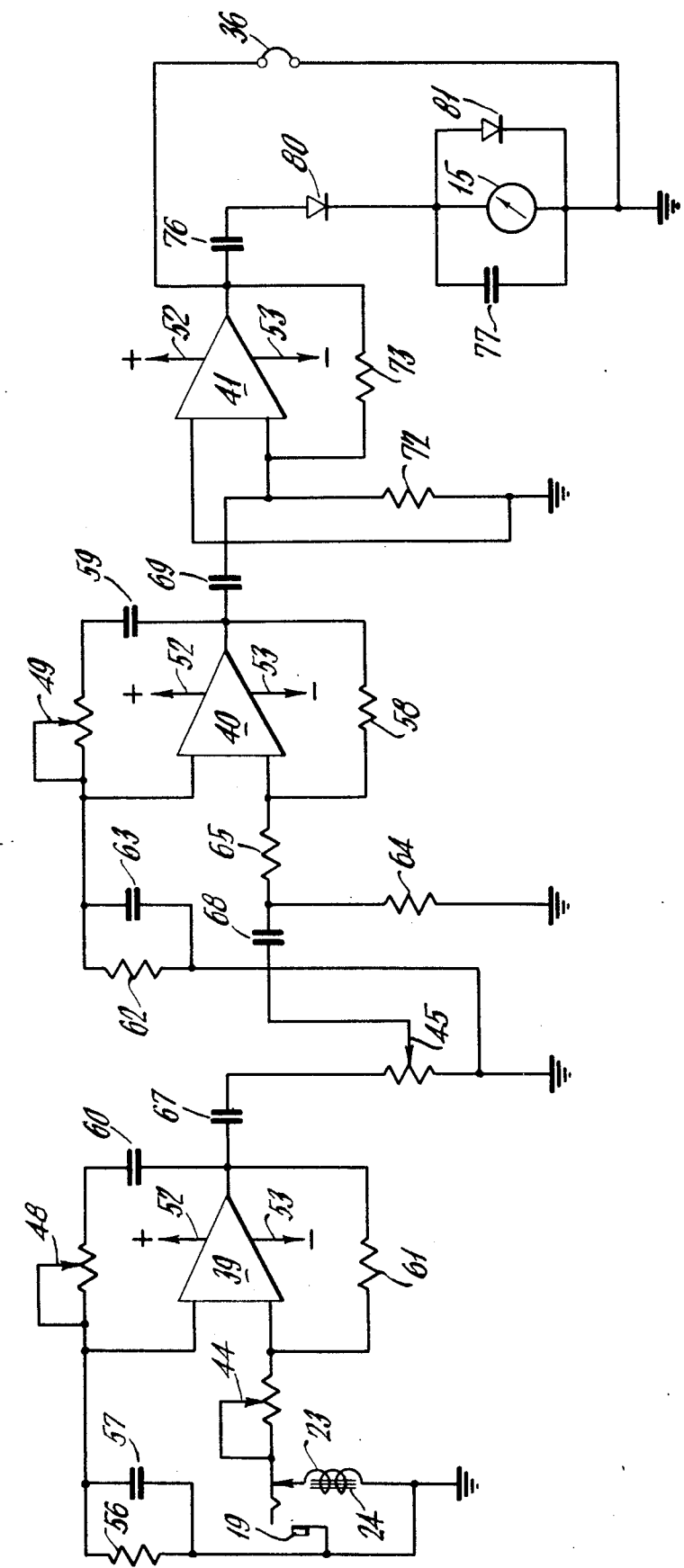
FIG. 2 is a schematic circuit diagram illustrating the circuit for an instrument in accordance with the FIG. 1 illustration.

Referring to FIG. 1, it will be observed that a locator instrument 10 which is illustrated has a housing 11 which may, of course, take any feasible form. Attached to the housing 11 is is a 12. The instrument 10 includes a meter 15 for providing visual indications of the amplitude of signals being detected, and there is a phone jack 16 for connecting a head set 36 which is not shown in FIG. 1 but is indicated in FIG. 2. There is another jack 19 which is to connect an auxillary probe (not shown) that may be employed under circumstances where necessary, e.g. in making a survey in a body of water with the pipe or pipeline located underneath.

There is a protective tube 20 that is attached to the housing 11 in the indicated position. This tube is preferably made of stainless steel and has sealed therein a pick-up coil 23 (see FIG. 2) that is wound upon a coaxially mounted ferromagnetic core 24 (FIG. 2) within the tube 20.

In addition there are necessary control elements such as a gain control knob 27 and a similar knob 28 for controlling regeneration of the amplifier circuits. Similarly, there is a power switch 31.

There is also a hinged rod 32 that is attached to the housing 11 so as to be supported beneath the tube 20 when not in use. The rod 32 is pivoted at a point 35 so that it may be swung down into the dashed line position illustrated in FIG. 1 when it is desired to set up a right angle position relative to the tube 20 for making depth measurements, as will be indicated in greater detail hereafter.

FIG. 2 is a schematic circuit diagram which illustrates a preferred type of tuned bandpass amplifier. The output thereof goes to the meter 15 and a heat set 36 which was mentioned above.

The foregoing tuned bandpass amplifier has three stages 39, 40 and 41. Each of these stages is made up of a solid state amplifier element e.g. an integrated-circuit operational amplifier, known commercially as type 741. The first two stages 39 and 40 are connected as Wien-bridge bandpass filter-amplifiers, while the third stage 41 is connected as a straightforward amplifier. There is a regeneration potentiometer 44 that is actuated by the knob 28 illustrated in FIG. 1. In addition there is a gain potentiometer 45 that divides the output signals from the first stage 39 as they are transmitted to the second stage 40. There are calibration potentiometers 48 and 49 that are associated with the first and second stages 39 and 40 respectively. These are adjustable to set the bandpass frequency for the integrated circuits of stages 39 and 40. As indicated above these are preferably set so as to have a relatively narrow bandpass at a frequency of 180 Hertz since this is the optimum frequency for making measurements with the most common radiated signals, that are (as indicated above) normally 60, 120, 180 or 240 Hertz.

The first and second stages are connected in a Weinbridge type circuit, as has been indicated above, in order to obtain the desired bandpass filtering with amplification. The third stage 41 is merely connected as a straightforward amplifier with a fixed gain.

The amount of gain of the various stages is a maxium of 600 for each of the first two filter-amplifier stages. However, it is preferred to have the gain of the first stage 39 adjustable from 1 to 600 by the regeneration potentiometer 44, while the gain of second stage 40 is set for a fixed gain of four. Consequently, the maximum gain of the first two stages will be 2,400. Also, the last stage 41 is set at a gain of ten so that the total for the instrument 10 is 24,000.

As indicated above, the jack 19 is for connecting an auxiliary probe having a coaxial extension cord. The circuit connections to the jack 19 are arranged as indicated in FIG. 2 so as to disconnect the pick-up coil 23 while connecting the auxiliary probe into the circuit.

It may be noted that the above indicated auxiliary probe is similar in structure as the pick-up coil 23 and protective tube 20. However, the auxiliary probe is connected on the end of a coaxial cable (not shown) that may be as long as about 100 feet. Such an external probe including coil, core and protective tube, is particularly useful in connection with making a determination of pipe location when the pipe is located beneath a body of water.

The circuit as illustrated by FIG. 2 is such that circuit ground is at zero volts. Furthermore, a practical circuit that has been constructed has employed various specific elements as indicated by the following. The power is supplied by two standard transistor-radio-type nine volt batteries (not shown). These are connected to each of the power-circuit lines 52 and 53 that are indicated by the arrows with an adjacent plus sign and minus sign, respectively.

Most of the corresponding elements of the first two stages 39 and 40 have identical circuit constants. The first stage 39 has a resistor 56 that is 6800 ohms, and a capacitor 57 that is connected there across having a value of one-tenth microfarad. The potentiometer 48 is a 10,000 ohm unit that is connected in series with a capacitor 60 which is a one-tenth microfarad unit. A resistor 61 is 10,000 ohms while the potentiometer 44 is a 20,000 ohm unit.

The pick-up coil 23 is made up of 5000 turns of number 36 wire, wound on a ferrite core having five-sixteenths inch diameter, with the length of the coil being 6½ inches.

Corresponding resistors and capacitors of the second stage 40 have the same values. Thus, a resistor 62 and capacitor 63 are 6800 ohms and one-tenth microfarad, respectively. The potentiometer 49 is 10,000 ohms, and a capacitor 59 in series therewith is one-tenth microfarad. Also, a resistor 58 is 10,000 ohms.

In addition there are other elements such as a resistor 64 that is 1000 ohms and a resistor 65 that is 4700 ohms. Also, a capacitor 68 and another capacitor 67 are interstage coupling units between the stages 39 and 40. These each have a value of 10 microfarads. Similarly, there is another interstage coupling capacitor 69 that is 10 microfarads which couples stage 40 to the last stage 41. This third stage amplifier 41 has the following circuit constants. A resistor 72 is 1000 ohms while a resistor 73 is 10,000 ohms.

The circuit constants for the meter and head set, output circuits are as follows. A capacitor 76 is 10 microfarads while a capacitor 77 is 50 microfarads connected in parallel with the meter 15. The meter is a zero-fifty microammeter. Two diodes 80 and 81 are solid state diodes having the commercial designation IN 475. The head set 36 has an impedance of 2000 ohms.

FIG. 3 illustrates a technique for using the locator 10. It will be observed that the schematic indication shows a cross section of a metallic pipe 84 that is beneath the surface of the earth 85. The locator 10 is shown above the surface of the ground 85 with its pick-up coil contained in the tube 20 shown in full lines pointing downward toward the pipe 84. It will be understood that the technique involves positioning of the pickup coil and tube 20 so as to move it directionally on either side of a suspected location for a buried pipe e.g. pipe 84.

While anyone skilled in this art would understand that different procedures might be employed in locating a buried pipe or pipe line, the following procedure is recommended. In an area where the general location of the pipe is not known, the locator should be held with the tube 20 about horizontal and then while noting the amplitude of the signal level it should be turned in its azimuth direction until a change with a rise and fall is noted. The azimuth of the low point indicates the general location of the pipe from the place where the locator is then situated.

Next, the tube 20 should be pointed down at the ground and the operator should walk in the azimuth direction indicated by the previous step. As the pipe is approached the amplitude will increase. Then, when the operator passes over the pipe there will be a pronounced decrease in amplitude followed by an increase on the other side. At the minimum amplitude location, the pipe is directly below. By again holding the tube 20 in a horizontal position and swinging it in an arc of about 30° either side of a given azimuth, the operator can determine what azimuth direction the pipe takes by noting when a sharp increase is obtained on either side of such direction.

When the locator 10 is directly over the pipe 84 by having followed the preliminary steps indicated above, the pipe can be followed by moving along while sweeping the tube 20 back and forth so as to follow the minimum amplitude or null signal. Such sweeping motion is indicated by the dashed line positions shown in FIG. 3, and a graphic signal amplitude showing is also illustrated in FIG. 3. Thus, the amplitude of the signal response will act as shown by a graph 89 that indicates by a curve 93 the amplitude of the signal response which is obtained as the pick-up coil 23 (within tube 20) is positioned by having its axis aimed toward the pipe 84 and also by swinging from one side to the other thereof. It will be noted that a minimum or null point 92 on the curve 93 is an indication of the direction when the axis of the coil is pointed directly at the pipe 84.

It will also be appreciated with reference to FIG. 4, that the locator 10 may be employed in determining the depth of a pipe, e.g. the pipe 84. Thus, the instrument 10 may be placed on the ground 85 so as to be supported by the tube 20 and the rod 32 after the latter has been pivoted out to its 90° position (illustrated in dashed lines in FIG. 1). This then sets the tube 20 at 45° relative to surface of the ground 85, and by moving the locator 10 along the surface at right angles to the axis of the pipe, a null indication will show the location where the tube 20 and pick-up coil 23 are pointed directly at the axis of the pipe 84. When this location is reached, simple triangulation indicates that a measurement of a distance 96 along the surface is equal to the depth beneath the surface to the axis of the pipe 84.

While a particular embodiment of the invention has been described above in considerable detail, this is not to be taken as in any way limiting the invention but merely as being descriptive thereof.

We claim:

1. In combination with a buried metallic pipe to be located, said pipe having AC signals impressed thereon being from AC operated cathodic protection currents or ground currents from AC operated equipment or induced currents from power lines or the like and said impressed AC signals being about 60 or 120 or 180 or 240 Hertz,
   a pipe locator comprising solely
   a short pick-up coil having an axial length of about 6½ inches and a ferromagnetic core associated therewith,
   said coil comprising about 5000 turns of insulated wire wound on a ferrite core of about five-sixteenths inch diameter
   said coil and core being mounted in a metallic protective shield,
   a tuned bandpass amplifier being tuned to about 180 Hertz and having the input thereof connected to said coil,
   said amplifier comprising three stages of solid state amplifiers,
   said first two stages being connected as Wien-bridge bandpass filter amplifiers,
   said third stage being connected as a straightforward amplifier, and
   means for detecting the output of said amplifier in order to permit a directional determination from said locator to said pipe by nulling effects of said AC signals in said coil.

2. A buried metallic pipe locator according to claim 1, further comprising
a housing for said locator including a hinged rod mounted thereon for supporting said coil and core at 45° relative to ground level.

3. A buried metallic pipe locator according to claim 2, further comprising
means for disconnecting said coil and connecting another external coil with a substantial length of coaxial cable for locating said pipe beneath a body of water.

4. A buried metallic pipe locator according to claim 3, wherein
said impressed AC signals are 60, 120, 180 or 240 Hertz, and
said tuned bandpass amplifier is set at 180 Hertz.

5. A buried metallic pipe locator where said pipe has AC signals comprising 60, 120, 180 or 240 Hertz impressed thereon from AC operated cathodic protection currents or ground currents from AC operated equipment or induced currents from power lines or the like, comprising
a short ferrite rod having about 5000 turns of small diameter insulated conductive wire wound thereon forming a pick-up coil for inductive coupling with said AC signals as radiated by said pipe,
a stainless steel tube with said coil and rod sealed coaxially therein,
a housing for said locator having said tube mounted thereon,
a hinged rod mounted on said housing and adapted for supporting said coil axis at 45° relative to ground level when in one position,
a tuned bandpass amplifier having its input connected to said pick-up coil and comprising three stages of solid state amplification,
said first two stages of amplification being connected as Wien-bridge bandpass amplifiers and said third stage being connected as a straightforward amplifier,
means for detecting said amplified signals comprising a head-set and a micro-ammeter with rectifiers both connected to the output of said third stage for determining both aurally and visually the amplitude of said amplified signals, and
means for disconnecting said pick-up coil and connecting another external coil rod and tube with a substantial length of coaxial cable for locating said pipe if beneath a body of water.

* * * * *